July 8, 1924.
J. WEBER
1,500,289
PROCESS FOR THE PRODUCTION OF AN ALKALI METAL SULPHATE AND HYDROCHLORIC ACID
Filed Aug. 30, 1921
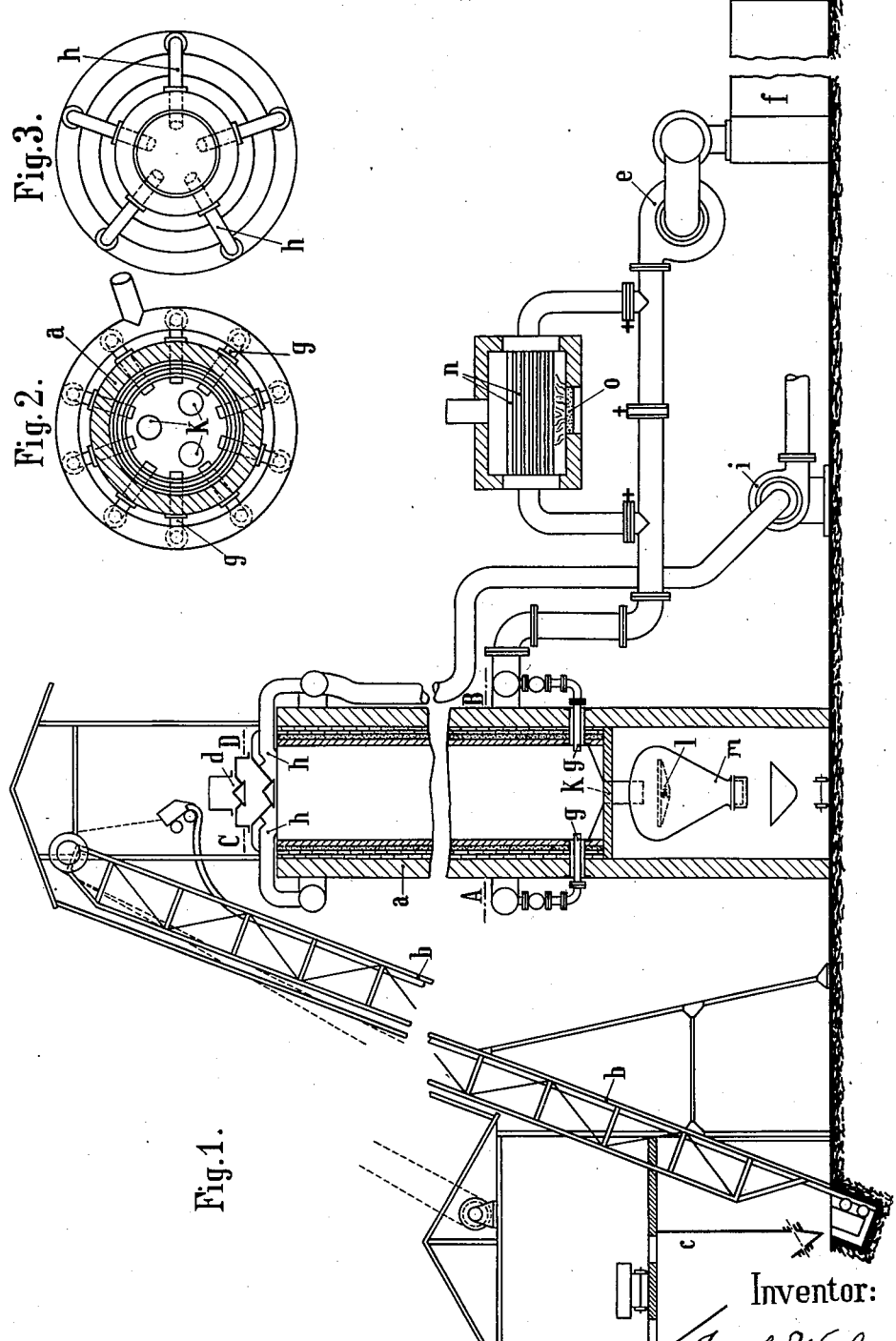
Inventor:

UNITED STATES PATENT OFFICE.

JOSEF WEBER, OF ESSEN, GERMANY.

PROCESS FOR THE PRODUCTION OF AN ALKALI METAL SULPHATE AND HYDROCHLORIC ACID.

Application filed August 30, 1921. Serial No. 496,908.

*To all whom it may concern:*

Be it known that I, JOSEF WEBER, a citizen of the German Republic, residing at Essen, Germany, have invented certain new and useful Improvements in Process for the Production of an Alkali Metal Sulphate and Hydrochloric Acid (for which I have filed an application in Germany on Sept. 9, 1919), of which the following is a specification.

This invention relates to a process and apparatus for the production of alkali metal sulphate and hydrochloric acid.

The initial material for the production of alkali metal sulphate is alkali metal chloride. There are principally two ways for effecting the transformation, for example of sodium chloride into sulphate with formation of hydrochloric acid. Either sulphuric acid is added to sodium chloride, the reaction then occurring according to the following equation:

$$2NaCl + H_2SO_4 = Na_2SO_4 + 2HCl.$$

Or sodium chloride is treated with sulphurous acid in the presence of oxygen and steam, whereby the following equation occurs:

$$2NaCl + SO_2 + O + H_2O = Na_2SO_4 + 2HCl.$$

The first way is the older one. It was first used by Leblanc for the production of soda and since then it has had an extensive application in practice as may be seen from the work of Dr. Georg Lunge "Handbuch der Soda-Industrie," Braunschweig 1909, Vol. II, pages 101 and 102. Its disadvantages are principally that in practice it requires considerable quantities of expensive sulphuric acid as well as expensive fuel, and a considerable number of strong and therefore highly paid workmen.

The second reaction was devised by Hargreaves half a century ago, and introduced into practice by an ingenious method of working. He designed a plant consisting of a series of vessels into which briquettes of sodium chloride were packed, and through which vessels sulphurous acid gases coming from roasting furnaces were passed in serial order, the fresh gas coming first into contact with the salt already most completely transformed, whereas the already spent gases were caused to act on fresh sodium chloride. In this manner when the contents of a vessel were completely transformed into sulphate the vessel was shut off, emptied and recharged. If, prior to shutting off, the vessel was the first one in the series, it became the last of the series when recharged, and thus came into contact with the gases which had become most exhausted.

This method of transforming sodium chloride contained in a series of transformation vessels by constantly changing over the gas current, discharging finally a vessel filled with sulphate alone, and of recharging the same with fresh salt briquettes is generally known in practice as the Hargreaves-process and has often been described.

It cannot be denied that this method has many advantages in comparison with the old sulphate process; the transformation of sulphurous acid into sulphuric acid is obviated and thus a great economy in coal and wages is attained.

Nevertheless, these advantages are not sufficient to have led to the general introduction of the Hargreaves process into practice. The reason for this is to be found in the fact that the plant is extremely complicated, initial expenses are very high and supervision is extremely difficult. Not only have shut off devices to be continuously actuated but lengths of communicating tubes must be shifted at intervals, in order to lead the gas current from the gas main into the system of vessels and the return into the hydrochloric acid collecting main. In order to pass the gas through the material under treatment the entire plant must work under sub-normal pressure. Since however it is not possible to tighten an extensive network of tubes with many valves and connecting pieces effectively against sub-normal pressure, especially since the gases passing through the network of pipes as in the present case are at a temperature of 400 to 500° C., the effluent gases containing hydrochloric acid are considerably diluted, and are thus rendered difficult to condense. To this has to be added the frequent interruption of the gas current for the purpose of emptying and recharging the vessels, whereby the reaction in all the vessels is arrested and consequently the transformation is irregular. Furthermore the emptying and recharging of the vessels is extremely troublesome because it can only be effected by hand. Thus for example, Lunge in his text-book on the Soda Industry 1909, second volume, page 200 states that three days are required for emptying and restarting the vessels.

A further disadvantage of this serial arrangement of the transformation vessels is that it is impossible to pass the mixture of gas in uniform distribution through the salt. In its way through the cylinders the gas takes the line of least resistance. It is impossible to pack the salt briquettes so evenly as to obtain complete uniform distribution of the gas from the inlet to the outlet. In consequence, those portions which are situated in the line of least resistance are met first by the gas current, and consequently are most quickly transformed, while in the other places where the gas resistance is greater, the transformation proceeds more slowly. Thus irregular reaction results. Local superheating occurs within the material which may lead to the melting of the salt briquettes and thus prevent the complete transformation of the salt into sulphate and even cause considerable difficulties in removing the molten mass from the cylinders. If one attempted to remove these disadvantages by introducing and removing the gas at several points, this alteration would necessitate the provision of other pipes which would make the plant still more complicated than it is already.

Although the method indicated by Hargreaves seems to be an important improvement on the old sulphate process, by dispensing with the intermediate production of sulphuric acid, and consequently requiring less coal and labor, the disadvantages of the Hargreaves process are on the other hand so great that only a few factories have employed it.

In consequence of the great importance which the economy of wages and coal have to-day, it is of special importance to replace the reaction which has already been used by Hargreaves by simple processes and by a simpler plant.

This problem is solved by the present invention which consists essentially in that the known transformation of chloride into sulphate, already proposed by Hargreaves, is effected in a shaft, by causing the salt to pass from the top to the bottom against the gas current, but in so modifying the process that the gas current can pass uninterruptedly through the shaft and meets the salt briquettes which are introduced from the top, and removed, as transformed sulphate, from the bottom of the shaft, the gas being introduced through nozzles above the space where the finished sulphate is removed. Particular attention has to be taken that the gas is passed in a uniform current from below upwards through the apparatus and that the salt moves uninterruptedly through the shaft downwards. This prevents superheating in the apparatus and the caking together of the salt briquettes. In the method according to Hargreaves such superheating can easily occur and, as mentioned above, the flow of the gases through the cylinder is very irregular.

Already Hargreaves himself attempted to overcome this local superheating (compare Lunge, Text Book of the Soda Industry, pages 180 to 182), and for this purpose he aspirated the gases through the cylinder from above downwards.

While, according to the invention an essential improvement in the distribution of temperature within the material under treatment is attained by passing the gases on the counterflow principle, this also constitutes a considerable difference as compared with the method according to Hargreaves. The same is the case with regard to the uninterrupted passage of the salt through the shaft in the method according to the invention. This also forms a great difference between the present invention and the method according to Hargreaves, inasmuch as the shaft in which the transformation of the salt is effected is not formed as a furnace, no means of directly heating the shaft being provided, in contradistinction to the Hargreaves cylinders which are all surrounded with heating flues. Should any heating or cooling of the gases used be required, this is effected, according to the present invention, by means of a heat interchange device situated outside the shaft.

It is true that also Hargreaves already speaks in his English Patents 3045/1870 and 3047/1870, in claim 6 (compare also Text Book of Chemical Technology by Rudolf Wagner, 11 edition, 1880, page 243, and "Production of Chlorine and Hydrochloric Acid," by N. Caro, 1893, page 74) of a tower for the continuous production of sulphate. However it is evident that this "alternative method" is only mentioned by him to prevent others from carrying out the reaction in a single tower-like vessel in comparison with his method of working in several vessels, arranged in series and interchangeable. That this claim 6 does not ensure continuous working can be gathered from the fact that sodium chloride rests on a grating and that the lower part of the chloride is intended to be withdrawn when it has been transformed into sulphate. This construction already prevents the continuous removal of the sulphate. Inasmuch as in the drawings the inlet for the gases and the discharge door for the sulphate are both situated immediately below the grating and on the same level, the gas must be stopped while the sulphate is being raked out, i. e.

the reaction must be interrupted because otherwise the escaping gases would make it impossible for the workmen to rake out the sulphate. The cold air then entering the tower disturbs the progress of transformation. No mention is made as to how the sulphate resting on the grating is brought below said grating. If for this purpose the bars of the grating were removed, the entire contents of the tower would run down and it would not be possible after removing a part of the sulphate to bring the shaft again into working operation, because the bars had to be again brought into their old position which however cannot be done as long as large quantities of sulphate or sodium chloride are still present in the tower. The defective description of this way of operating is in strong contrast with the description of the process proper. In any case is is evident that, so far as his specification can be understood at all, Hargreaves was obliged to shut off the gases during the raking out of the sulphate, that is during the downward movement of the contents of the tower and that when he let the gas in again the mass in the tower was at rest. It is true that Hargreaves speaks of working in a tower, of the ascent of the gases in the same, and also of charging the salt from the top and raking out at the bottom, but he nevertheless failed to recognize the possibility of working with a counter-current of salt and gas.

Really continuous working is only attained by means of the process of the present invention in which the discharge opening is provided at the bottom of the shaft and the admission of the gas is effected through a ring of nozzles above the discharge opening. Stopping the gas current during the removal of the sulphate is not required in this method. Inasmuch as the gas enters under great pressure through the nozzles into the shaft it forces its way into the middle of same and then distributes itself uniformly through the entire contents of the shaft in its ascent, the material passing continuously downwards, so that the formation of gas channels is prevented and uniform removal is effected.

In the drawings an embodiment of the invention is shown by way of example.

Fig. 1 is a longitudinal section through the shaft in which the process acording to the present invention is carried out;

Fig. 2 is a cross section of the shaft along the lines A—B of Fig. 1; and

Fig. 3 is a cross section along lines C—D of Fig. 1.

$a$ indicates the shaft which is charged with sodium chloride by means of the inclined elevator $b$ from the storage bins $c$. $d$ is a bell through which the salt is passed into the shaft without loss of gas in charging the shaft. The gas is drawn by means of a fan $e$ from the roasting furnace $f$ and blown through the nozzles $g$ into the interior of the shaft. The nozzles $g$ are arranged in the form of a ring around the lower circumference of the shaft $a$ as can be seen from Fig 2. The gas now ascends the shaft and is drawn off at the top through the discharge pipes $h$ which are connected to the fan $i$. The discharge pipes $h$ are similar to the inlet nozzles $g$ uniformly arranged in the form of ring around the bell on the cover of the shaft, as can be seen especially from Fig. 3. Their distance from the walls of the shaft is about the same as from the centre of the shaft. The salt introduced through the bell $d$ into the shaft is transformed during its continuous passage against the gas current, from the top to the bottom of the shaft. The bottom of the shaft is provided with three hopper-shaped discharge openings $k$ through which the sulphate falls over a mechanical discharger $l$ into a silo $m$, the capacity of which is equal to that of the trucks placed below them. The silos can be closed by means of a flap or the like. A brief opening of the flap is sufficient to fill the truck waiting below, the time required being so short that the outer air cannot enter the shaft. Near the principal gas inlet main is arranged the heat-interchange device which essentially consists of a sheaf of tubes $n$ and a coke-fire $o$.

The employment of one shaft and the provision of discharge openings—arranged below the gas inlet nozzles—for the sulphate formed by the known transformation of alkali metal chloride with formation of hydrochloric acid, enables the work to be carried on continuously. A large working chamber is provided, the dimensions of which suffice to ensure more uniform contact of the materials under reaction and thereby a more uniform progress of the reaction. The arrangement of the in- and outlet nozzles in the form of rings also contributes to this uniform progress of the reaction. In the example given it has been assumed that the introduction of the gas mixture is only effected in the lower part of the shaft. However, a second and third gas inlet are provided above the first thus enabling accurate adjustment of the temperature at all levels in the shaft.

To the uniform passage of the gas through the shaft there corresponds a uniform passage of the salt through the same. For preventing, for example the material situated in the centre from falling down quicker through a central discharge opening than the material round the sides, several discharge openings are provided, for example three, which are arranged above the bottom. By uniformly working these discharge openings, the course of the material through the furnace can be controlled so as to be perfectly uniform.

What I claim is:

1. The process for the production of alkali metal sulphates and hydrochloric acid from alkali metal chlorides consisting therein that an alkali metal chloride is caused to pass from the top to the bottom of a shaft against an uninterrupted current of an atmosphere of gases comprising sulphurous acid, water vapor and oxygen, and the solid product of reaction of said alkali metal chloride with said gases is discharged at the bottom and the gaseous reaction product at the top of the shaft.

2. The process for the production of alkali metal sulphates and hydrochloric acid from alkali metal chlorides consisting therein that an alkali metal chloride is caused to pass from the top to the bottom of a shaft against an uninterrupted current of reaction gas, and the solid product of reaction of said alkali metal chloride with said gas is discharged at the bottom and the gaseous reaction product at the top of the shaft, the reaction gas being introduced into the shaft above the bottom of same.

3. The process for the production of alkali metal sulphates and hydrochloric acid from alkali metal chlorides consisting therein that an alkali metal chloride is caused to pass from the top to the bottom of a shaft against an uninterrupted current of reaction gas, and the solid product of reaction discharged at the bottom and the gaseous reaction product discharged at the top of the shaft, the reaction gas being introduced at several superimposed points of the shaft.

4. The process for the production of alkali metal sulphates and hydrochloric acid from alkali metal chlorides consisting therein that an alkali metal chloride is caused to pass from the top to the bottom of a shaft against an uninterrupted current of reaction gas, and the solid product of reaction discharged at the bottom and the gaseous reaction product discharged at the top of the shaft, constituents of the reaction gas being introduced at different points of the shaft.

5. The process for the production of alkali metal sulphates and hydrochloric acid from alkali metal chlorides consisting therein that an alkali metal chloride is caused to pass from the top to the bottom of a shaft against an uninterrupted current of reaction gas, and the finished product removed at the bottom of the shaft, the gaseous reaction product being discharge at the top of the shaft.

6. The process for the production of alkali metal sulphates and hydrochloric acid from alkali metal chlorides consisting therein that an alkali metal chloride is caused to pass from the top to the bottom of a shaft against an uninterrupted current of reaction gas under positive temperature control, and the solid product of reaction of said alkali metal chloride with said gas is discharged at the bottom and the gaseous reaction product at the top of the shaft.

In testimony whereof I affix my signature in presence of two witnesses.

DR. JOSEF WEBER.

Witnesses:
AUGUST WALTER,
FRITZ RUHL.